United States Patent
Katrak

(10) Patent No.: US 10,148,100 B2
(45) Date of Patent: *Dec. 4, 2018

(54) DIAGNOSTIC SYSTEM FOR A BATTERY SYSTEM

(71) Applicant: LG Chem, Ltd., Seoul (KR)

(72) Inventor: Kerfegar K. Katrak, Fenton, MI (US)

(73) Assignee: LG Chem, Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/607,506

(22) Filed: May 28, 2017

(65) Prior Publication Data

US 2017/0373356 A1 Dec. 28, 2017

Related U.S. Application Data

(60) Provisional application No. 62/354,847, filed on Jun. 27, 2016.

(51) Int. Cl.
*H02J 7/00* (2006.01)
*G06F 13/14* (2006.01)
(Continued)

(52) U.S. Cl.
CPC ............ *H02J 7/0026* (2013.01); *G06F 13/14* (2013.01); *G06F 13/38* (2013.01); *H01M 10/425* (2013.01);
(Continued)

(58) Field of Classification Search
CPC ..... H02J 7/0026; H01M 10/482; G06F 13/14; G06F 13/38; B60R 16/033
See application file for complete search history.

(56) References Cited

U.S. PATENT DOCUMENTS 5,606,242 A * 2/1997 Hull ...................... H02J 7/0004
320/106
6,069,821 A * 5/2000 Jun ......................... G11C 11/56
365/185.03
(Continued)

FOREIGN PATENT DOCUMENTS

JP 2009017651 A 1/2009
JP 2011027609 A 2/2011
(Continued)

OTHER PUBLICATIONS

U.S. Appl. No. 15/607,510, filed May 28, 2017 entitled Diagnostic System for a Battery System.
(Continued)

*Primary Examiner* — Naum B Levin
(74) *Attorney, Agent, or Firm* — Buckert Patent & Trademark Law Firm PC; John F. Buckert

(57) ABSTRACT

A diagnostic system for a battery system having a battery module electrically coupled to a contactor is provided. The battery module has first, second, and third battery cells. The diagnostic system includes a first microcontroller that transitions the contactor to an open operational state if the first battery cell analog overvoltage flag is equal to the first battery cell analog overvoltage flag value. The first microcontroller further transitions the contactor to the open operational state if the first battery cell comparator overvoltage flag is equal to the first battery cell comparator overvoltage flag value.

16 Claims, 9 Drawing Sheets

(51) Int. Cl.
*G06F 13/38* (2006.01)
*H01M 10/48* (2006.01)
*H01M 10/42* (2006.01)
*B60R 16/033* (2006.01)

(52) U.S. Cl.
CPC ......... *H01M 10/482* (2013.01); *B60R 16/033* (2013.01); *H01M 2010/4278* (2013.01); *H01M 2220/20* (2013.01)

(56) References Cited

U.S. PATENT DOCUMENTS

| | | | | |
|---|---|---|---|---|
| 6,611,774 | B1* | 8/2003 | Zaccaria | G01R 31/3648 |
| | | | | 320/116 |
| 7,081,737 | B2* | 7/2006 | Liu | H01M 10/441 |
| | | | | 320/130 |
| 7,714,674 | B2* | 5/2010 | Guo | H03L 1/02 |
| | | | | 331/109 |
| 7,969,119 | B2* | 6/2011 | Odaohhara | H02J 7/045 |
| | | | | 320/134 |
| 8,378,868 | B2* | 2/2013 | Lyles | G01R 31/3658 |
| | | | | 320/134 |
| 9,970,991 | B2* | 5/2018 | Katrak | B60L 11/1851 |
| 2007/0257642 | A1* | 11/2007 | Xiao | H02J 7/0026 |
| | | | | 320/134 |
| 2009/0009143 | A1 | 1/2009 | Odaohhara | |
| 2009/0021871 | A1* | 1/2009 | Moran | B60K 6/28 |
| | | | | 361/15 |
| 2011/0025271 | A1 | 2/2011 | Yamamoto et al. | |
| 2013/0017421 | A1* | 1/2013 | Onnerud | B60R 21/01 |
| | | | | 429/61 |
| 2014/0354242 | A1* | 12/2014 | Tsutsui | H02J 7/0029 |
| | | | | 320/162 |
| 2015/0130419 | A1* | 5/2015 | Zhai | H02J 7/0073 |
| | | | | 320/112 |
| 2016/0025815 | A1 | 1/2016 | Baughman | |
| 2017/0373357 | A1* | 12/2017 | Katrak | H01M 10/482 |
| 2017/0373358 | A1* | 12/2017 | Katrak | H01M 10/482 |

FOREIGN PATENT DOCUMENTS

| | | |
|---|---|---|
| JP | 2011127947 A | 6/2011 |
| JP | 2013190258 A | 9/2013 |

OTHER PUBLICATIONS

U.S. Appl. No. 15/607,511, filed May 28, 2017 entitled Diagnostic System for a Battery System.

* cited by examiner

TABLE - BATTERY CELL ANALOG OVERVOLTAGE FLAG VALUES

| | BINARY | DECIMAL |
|---|---|---|
| 782 — INITIALIZATION VALUE | 111 | 7 |
| 784 — FIRST BATTERY CELL ANALOG OVERVOLTAGE FLAG VALUE | 001 | 1 |
| 786 — SECOND BATTERY CELL ANALOG OVERVOLTAGE FLAG VALUE | 100 | 4 |
| 788 — THIRD BATTERY CELL ANALOG OVERVOLTAGE FLAG VALUE | 010 | 2 |

TABLE - BATTERY CELL COMPARATOR OVERVOLTAGE FLAG VALUES

| | BINARY | DECIMAL |
|---|---|---|
| 802 — INITIALIZATION VALUE | 000 | 0 |
| 804 — FIRST BATTERY CELL COMPARATOR OVERVOLTAGE FLAG VALUE | 110 | 6 |
| 806 — SECOND BATTERY CELL COMPARATOR OVERVOLTAGE FLAG VALUE | 011 | 3 |
| 808 — THIRD BATTERY CELL COMPARATOR OVERVOLTAGE FLAG VALUE | 101 | 5 |

TABLE - BATTERY MODULE NUMBERS

|  | BINARY | DECIMAL |
|---|---|---|
| 831 — FIRST BATTERY MODULE NUMBER | 110 | 6 |
| 832 — SECOND BATTERY MODULE NUMBER | 001 | 1 |
| 833 — THIRD BATTERY MODULE NUMBER | 100 | 4 |
| 834 — FOURTH BATTERY MODULE NUMBER | 111 | 7 |

TABLE - EXEMPLARY STORED DIAGNOSTIC INFORMATION

| | BATTERY CELL ANALOG OVERVOLTAGE FLAG | BATTERY MODULE NUMBER |
|---|---|---|
| 861 | 001 | 110 |
| 862 | 100 | 110 |
| 863 | 010 | 110 |
| 864 | 111 | 001 |
| 865 | 111 | 001 |
| 866 | 111 | 001 |
| 867 | 111 | 100 |
| 868 | 111 | 100 |
| 869 | 111 | 100 |
| 870 | 111 | 111 |
| 871 | 111 | 111 |
| 872 | 111 | 111 |

TABLE - EXEMPLARY STORED DIAGNOSTIC INFORMATION

| BATTERY MODULE NUMBER | BATTERY CELL COMPARATOR OVERVOLTAGE FLAG |
|---|---|
| 110 | 011 |
| 110 | 101 |
| 110 | 110 |
| 001 | 000 |
| 001 | 000 |
| 001 | 000 |
| 100 | 000 |
| 100 | 000 |
| 100 | 000 |
| 111 | 000 |
| 111 | 000 |
| 111 | 000 |

DIAGNOSTIC SYSTEM FOR A BATTERY SYSTEM

CROSS-REFERENCE TO RELATED APPLICATION

This application claims priority to U.S. Provisional Patent Application No. 62/354,847 filed on Jun. 27, 2016, the entire contents of which are hereby incorporated by reference herein.

BACKGROUND

The inventor herein has recognized a need for a diagnostic system for a battery system that utilizes battery cell analog overvoltage flags and battery cell comparator flags to determine when a contactor electrically coupled to a battery module is to be transitioned to an open operational state.

In particular, the inventor has recognized that it would be advantageous to have a diagnostic system that utilizes two independent types of flags (e.g., battery cell analog overvoltage flags and battery cell comparator overvoltage flags) that can be set to fault values, based on a first threshold voltage value and a magnitude of a voltage comparator threshold voltage, respectively, that are different from one another—to determine when a contactor is to be transitioned to an open operational state. As a result, the diagnostic system has diagnostic diversity and can command the contactor to open when a battery cell analog overvoltage flag indicates an output voltage value of a battery cell in the battery module is greater than a first threshold voltage value, or when a battery cell comparator overvoltage flag indicates that an output voltage of a battery cell in the battery module is greater than a magnitude of a voltage comparator threshold voltage, or both.

SUMMARY

A diagnostic system for a battery system in accordance with an exemplary embodiment is provided. The battery system has a battery module electrically coupled to a contactor. The battery module has first, second, and third battery cells. The diagnostic system includes a first microcontroller that obtains a first initialization value and first, second, and third battery cell analog overvoltage flag values from a memory device. The first, second, and third analog overvoltage flag values are associated with the first, second, and third battery cells, respectively. The first microcontroller further obtains a second initialization value and first, second, and third battery cell comparator overvoltage flag values from the memory device. The first, second, and third battery cell comparator overvoltage flag values are associated with the first, second, and third battery cells, respectively. The first microcontroller initializes each of first, second, and third battery cell analog overvoltage flags to the first initialization value. The first microcontroller receives first, second, and third output voltage values from a second microcontroller. The first, second, and third output voltage values correspond to first, second, and third output voltages, respectively, from the first, second, and third battery cells, respectively. The first microcontroller sets the first battery cell analog overvoltage flag equal to the first battery cell analog overvoltage flag value if the first output voltage value is greater than a first threshold voltage value. The first microcontroller sets the second battery cell analog overvoltage flag equal to the second battery cell analog overvoltage flag value if the second output voltage value is greater than the first threshold voltage value. The first microcontroller sets the third battery cell analog overvoltage flag equal to the third battery cell analog overvoltage flag value if the third output voltage value is greater than the first threshold voltage value. The first microcontroller transitions the contactor to an open operational state if the first battery cell analog overvoltage flag is equal to the first battery cell analog overvoltage flag value or the second battery cell analog overvoltage flag equal to the second battery cell analog overvoltage flag value or the third battery cell analog overvoltage flag equal to the third battery cell analog overvoltage flag value. The first microcontroller initializes each of first, second, and third battery cell comparator overvoltage flags to the second initialization value. The first microcontroller receives first, second, and third comparator bits from the second microcontroller. The first comparator bit has a first fault value if the first output voltage is greater than a voltage comparator threshold voltage. The second comparator bit has the first fault value if the second output voltage is greater than the voltage comparator threshold voltage. The third comparator bit has the first fault value if the third output voltage is greater than voltage comparator threshold voltage. The voltage comparator threshold voltage has a magnitude that is greater than the first threshold voltage value. The first microcontroller sets the first battery cell comparator overvoltage flag equal to the first battery cell comparator overvoltage flag value if the first comparator bit is equal to the first fault value. The first microcontroller sets the second battery cell comparator overvoltage flag equal to the second battery cell comparator overvoltage flag value if the second comparator bit is equal to the first fault value. The first microcontroller sets the third battery cell comparator overvoltage flag equal to the third battery cell comparator overvoltage flag value if the third comparator bit is equal to the first fault value. The first microcontroller transitions the contactor to the open operational state if the first battery cell comparator overvoltage flag is equal to the first battery cell comparator overvoltage flag value or the second battery cell comparator overvoltage flag is equal to the second battery cell comparator overvoltage flag value or the third battery cell comparator overvoltage flag is equal to the third battery cell comparator overvoltage flag value.

A diagnostic system for a battery system in accordance with another exemplary embodiment is provided. The battery system has first, second, third and fourth battery modules electrically coupled in series to a contactor. The first battery module has at least a first battery cell, and the second battery module has at least a first battery cell. The third battery module has at least a first battery cell, and the fourth battery module has at least a first battery cell. The diagnostic system includes a memory device having first, second, and third tables stored therein. The first table has first, second, third and fourth battery module numbers associated with the first, second, third and fourth battery modules, respectively. The first, second, and third battery module numbers have a Hamming distance of at least two from each other. The diagnostic system includes a first microcontroller that reads the first table stored in the memory device to obtain the first, second, third and fourth battery module numbers. The first microcontroller sets a first battery cell analog overvoltage flag associated with the first battery cell in the first battery module to a first value. The first microcontroller stores the first battery cell analog overvoltage flag and the first battery module number in a first record in the second table. The first microcontroller sets a first battery cell comparator overvoltage flag associated with the first battery cell in the first battery module to a second value. The first microcontroller stores the first battery cell comparator overvoltage flag and the first battery module number in a first record in the third table.

BRIEF DESCRIPTION OF THE DRAWINGS

FIG. 2 is a table of battery cell analog overvoltage flag values utilized by the diagnostic system of FIG. 1;

FIG. 3 is a table of battery cell comparator overvoltage flag values utilized by the diagnostic system of FIG. 1;

FIG. 4 is a table of battery module numbers associated with first, second, third, and fourth battery modules, that are utilized by the diagnostic system of FIG. 1;

FIG. 5 is a first table of exemplary stored diagnostic information generated by the diagnostic system of FIG. 1;

DETAILED DESCRIPTION

Figure 1:
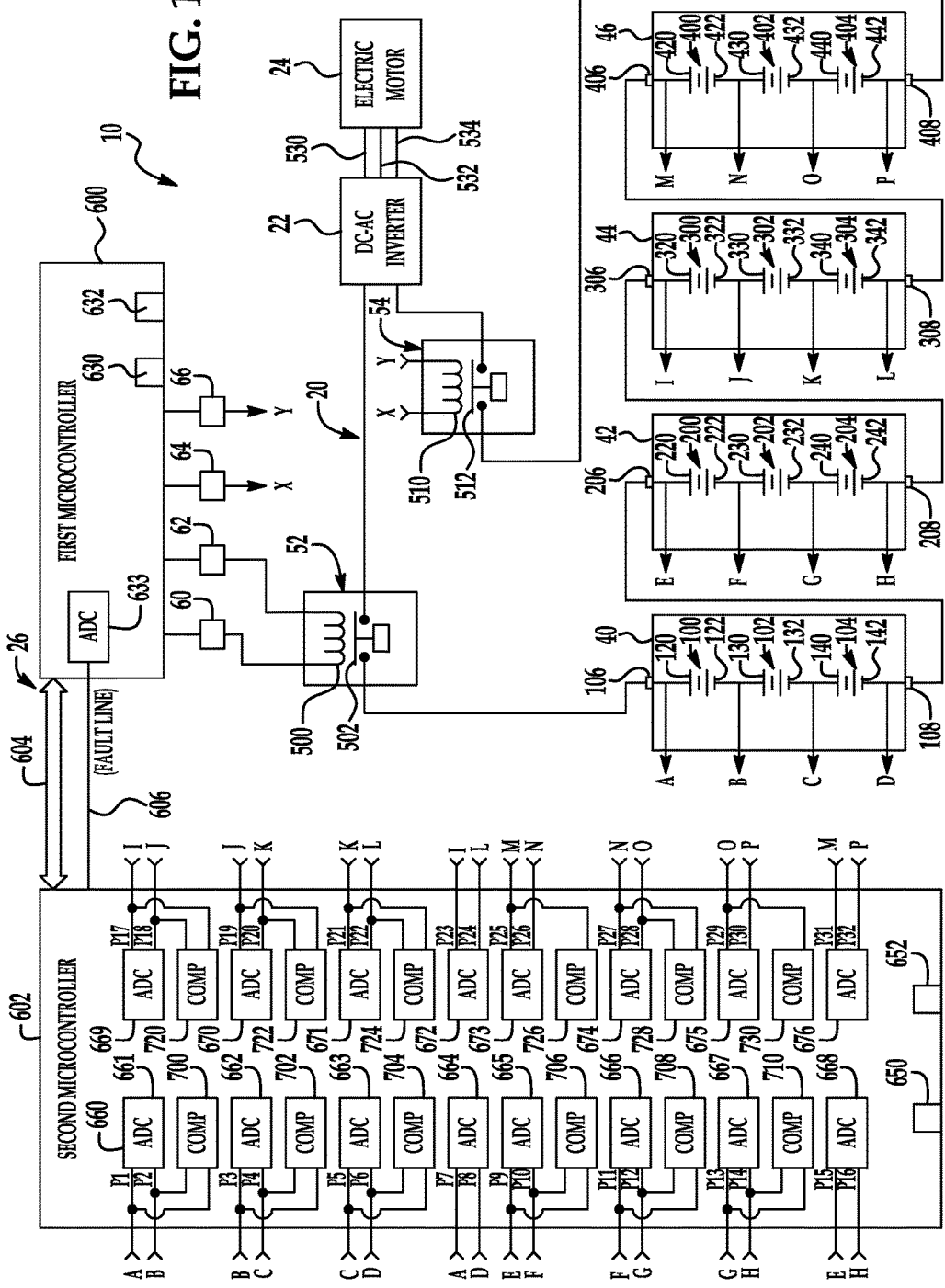
FIG. 1 is a schematic of a vehicle having a battery system, an electric motor, and a diagnostic system in accordance with an exemplary embodiment.

Referring to FIG. 1, a vehicle 10 includes a battery system 20, a DC-AC inverter 22, an electric motor 24, and a diagnostic system 26 in accordance with an exemplary embodiment.

An advantage of the diagnostic system 26 is that the system utilizes two independent types of flags (e.g., battery cell analog overvoltage flags and battery cell comparator overvoltage flags) that can be set to fault values, based on a first threshold voltage value and a magnitude of a voltage comparator threshold voltage, respectively, that are different from one another—to determine when a contactor is to be transitioned to an open operational state. As a result, the diagnostic system 26 has diagnostic diversity and can command the contactor to open when a battery cell analog overvoltage flag indicates an output voltage value of a battery cell in the battery module is greater than a first threshold voltage value, or when a battery cell comparator overvoltage flag indicates that an output voltage of a battery cell in the battery module is greater than a magnitude of a voltage comparator threshold voltage, or both.

The battery system 20 provides a DC voltage to the DC-AC inverter 22. The battery system 20 includes battery modules 40, 42, 44, 46, contactors 52, 54, and voltage drivers, 60, 62, 64, 66.

The battery module 40 has first, second, and third battery cells 100, 102, 104 electrically coupled in series with one another between a positive battery module terminal 106 and a negative battery module terminal 108. In an exemplary embodiment, the first, second, and third battery cells 100, 102, 104 are pouch-type lithium-ion battery cells. Of course, in an alternative embodiment, each of the first, second, and third battery cells 100, 102, 104 could comprise another type of battery cell such as nickel-cadmium battery cell, a nickel-metal-hydride battery cell, or a lead acid battery cell for example. The first battery cell 100 has a positive terminal 120 and a negative terminal 122. Also, the second battery cell 102 has a positive terminal 130 and a negative terminal 132. Further, the third battery cell 104 has a positive terminal 140 and a negative terminal 142. The positive terminal 120 of the first battery cell 100 is coupled to the positive battery module terminal 106. The negative terminal 122 of the first battery cell 100 is coupled to the positive terminal 130 of the second battery cell 102. The negative terminal 132 of the second battery cell 102 is coupled to the positive terminal 140 of the third battery cell 104. The negative terminal 142 of the third battery cell 104 is coupled to the negative battery module terminal 108. The negative battery module terminal 108 is electrically coupled to the positive battery module terminal 206 of the battery module 42. In an alternative embodiment, the battery module 40 could have a plurality of additional battery cells electrically coupled to one another in series with the first, second, and third battery cells 100, 102, 104, or comprise only a single battery cell.

The battery module 42 has first, second, and third battery cells 200, 202, 204 electrically coupled in series with one another between a positive battery module terminal 206 and a negative battery module terminal 208. In an exemplary embodiment, the first, second, and third battery cells 200, 202, 204 are pouch-type lithium-ion battery cells. Of course, in an alternative embodiment, each of the first, second, and third battery cells 200, 202, 204 could comprise another type of battery cell such as nickel-cadmium battery cell, a nickel-metal-hydride battery cell, or a lead acid battery cell for example. The first battery cell 200 has a positive terminal 220 and a negative terminal 222. Further, the second battery cell 202 has a positive terminal 230 and a negative terminal 232. Further, the third battery cell 204 has a positive terminal 240 and a negative terminal 242. The positive terminal 220 of the first battery cell 200 is coupled to the positive battery module terminal 206. The negative terminal 222 of the first battery cell 200 is coupled to the positive terminal 230 of the second battery cell 202. The negative terminal 232 of the second battery cell 202 is coupled to the positive terminal 240 of the third battery cell 204. The negative terminal 242 of the third battery cell 204 is coupled to the negative battery module terminal 208. Further, the negative battery module terminal 208 is electrically coupled to the positive battery module terminal 306 of the battery module 44. In an alternative embodiment, the battery module 42 could have a plurality of additional battery cells electrically coupled to one another in series with the first, second, and third battery cells 200, 202, 204, or comprise only a single battery cell.

The battery module 44 has first, second, and third battery cells 300, 302, 304 that are electrically coupled in series with one another between a positive battery module terminal 306 and a negative battery module terminal 308. In an exemplary embodiment, the first, second, and third battery cells 300, 302, 304 are pouch-type lithium-ion battery cells. Of course, in an alternative embodiment, each of the first, second, and third battery cells 300, 302, 304 could comprise another type of battery cell such as nickel-cadmium battery cell, a nickel-metal-hydride battery cell, or a lead acid battery cell for example. The first battery cell 300 has a positive terminal 320 and a negative terminal 322. Further, the second battery cell 302 has a positive terminal 330 and a negative terminal 332. Further, the third battery cell 304 has a positive terminal 340 and a negative terminal 342. The positive terminal 320 of the first battery cell 300 is coupled to the positive battery module terminal 306. The negative terminal 322 of the first battery cell 300 is coupled to the positive terminal 330 of the second battery cell 302. The negative terminal 332 of the second battery cell 302 is coupled to the positive terminal 340 of the third battery cell 304. The negative terminal 342 of the third battery cell 304 is coupled to the negative battery module terminal 308. Further, the negative battery module terminal 308 is electrically coupled to the positive battery module terminal 406 of the battery module 46. In an alternative embodiment, the battery module 44 could have a plurality of additional battery cells electrically coupled to one another in series with the first, second, and third battery cells 300, 302, 304, or comprise only a single battery cell.

The battery module 46 has first, second, and third battery cells 400, 402, 404 electrically coupled in series with one another between a positive battery module terminal 406 and a negative battery module terminal 408. In an exemplary embodiment, the first, second, and third battery cells 400, 402, 404 are pouch-type lithium-ion battery cells. Of course, in an alternative embodiment, each of the first, second, and third battery cells 400, 402, 404 could comprise another type of battery cell such as nickel-cadmium battery cell, a nickel-metal-hydride battery cell, or a lead acid battery cell for example. The first battery cell 400 has a positive terminal 420 and a negative terminal 422. Further, the second battery cell 402 has a positive terminal 430 and a negative terminal 432. Further, the third battery cell 404 has a positive terminal 440 and a negative terminal 442. The positive terminal 420 of the first battery cell 400 is coupled to the positive battery module terminal 406. The negative terminal 422 of the first battery cell 400 is coupled to the positive terminal 430 of the second battery cell 402. The negative terminal 432 of the second battery cell 402 is coupled to the positive terminal 440 of the third battery cell 404. The negative terminal 442 of the third battery cell 404 is coupled to the negative battery module terminal 408. In an alternative embodiment, the battery module 46 could have a plurality of additional battery cells electrically coupled to one another in series with the first, second, and third battery cells 400, 402, 404, or comprise only a single battery cell.

The contactor 52 is electrically coupled in series between the positive battery module terminal 106 and the DC-AC inverter 22. The contactor 52 includes a contactor coil 500 and a contact 502. When the first microcontroller 600 generates first and second control signals that are received by the voltage drivers 60, 62, respectively, the voltage drivers 60, 62, energize the contactor coil 500, which moves the contact 502 to a closed operational state. Alternately, when the first microcontroller 600 stops generating the first and second control signals, the voltage drivers 60, 62 de-energize the contactor coil 500, which moves the contact 502 to an open operational state.

The contactor 54 is electrically coupled in series between the negative battery module terminal 408 and the DC-AC inverter 22. The contactor 54 includes a contactor coil 510 and a contact 512. When the first microcontroller 600 generates third and fourth control signals that are received by the voltage drivers 64, 66, respectively, the voltage drivers 64, 66, energize the contactor coil 510, which moves the contact 512 to a closed operational state. Alternately, when the first microcontroller 600 stops generating the third and fourth control signals, the voltage drivers 64, 66 de-energize the contactor coil 510, which moves the contact 512 to an open operational state.

The DC-AC inverter 22 is electrically coupled to and between the contactors 52, 54, and provides AC power to the electric motor 24 via the electrical lines 530, 532, 534, only when the contactors 52, 54 each have a closed operational state.

The diagnostic system 26 includes a first microcontroller 600, a second microcontroller 602, a communication bus 604, and a fault line 606.

The first microcontroller 600 includes a microprocessor 630, a memory device 632, and an analog-to-digital converter (ADC) 633. The microprocessor 630 operably communicates with the memory device 632 and the analog-to-digital converter 633. Further, the microprocessor 630 operably communicates with the microprocessor 650 of the second microcontroller 602 via the communication bus 604, and the fault line 606 which is electrically coupled to the analog-to-digital converter 633. The microprocessor 630 utilizes software instructions stored in the memory device 632 to implement at least in part the diagnostic steps described hereinafter, based on data and values received from the second microcontroller 602, as will be described in greater detail below.

The second microcontroller 602 includes a microprocessor 650, a memory device 652, an analog-to-digital converter (ADC) 660, and voltage comparators 700, 702, 704, 706, 708, 710, 720, 722, 724, 726, 728, 730. The microprocessor 650 operably communicates with the memory device 652, the analog-to-digital converter 660, and the voltage comparators 700, 702, 704, 660, 708, 710, 720, 722, 724, 726, 728, 730. The microprocessor 650 utilizes software instructions stored in the memory device 652 to implement at least in part the operational steps for the second microcontroller 602.

The analog-to-digital converter 660 includes ADC differential channels 661, 662, 663, 664, 665, 666, 667, 668, 669, 670, 671, 672, 673, 674, 675, 676.

The ADC differential channel 661 has input pins P1, P2 which are electrically coupled to the positive terminal 120 and the negative terminal 122, respectively, of the first battery cell 100 to measure an output voltage of the first battery cell 100 between the terminals 120, 122, and the analog-to-digital converter 660 generates an output voltage value based on the measured output voltage.

The ADC differential channel 662 has input pins P3, P4 which are electrically coupled to the positive terminal 130 and the negative terminal 132, respectively, of the second battery cell 102 to measure an output voltage of the second battery cell 102 between the terminals 130, 132, and the analog-to-digital converter 660 generates an output voltage value based on the measured output voltage.

The ADC differential channel 663 has input pins P5, P6 which are electrically coupled to the positive terminal 140 and the negative terminal 142, respectively, of the third battery cell 104 to measure an output voltage of the third battery cell 104 between the terminals 140, 142, and the analog-to-digital converter 660 generates an output voltage value based on the measured output voltage.

The ADC differential channel 664 has input pins P7, P8 which are electrically coupled to the positive battery module terminal 106 and a negative battery module terminal 108 to measure a battery module output voltage of the battery module 40, and the analog-to-digital converter 660 generates a battery module output voltage value based on the measured battery module output voltage.

The ADC differential channel 665 has input pins P9, P10 which are electrically coupled to the positive terminal 220 and the negative terminal 222, respectively, of the first battery cell 200 to measure an output voltage of the first battery cell 200 between the terminals 220, 222, and the analog-to-digital converter 660 generates an output voltage value based on the measured output voltage.

The ADC differential channel 666 has input pins P11, P12 which are electrically coupled to the positive terminal 230 and the negative terminal 232, respectively, of the second battery cell 202 to measure an output voltage of the second battery cell 202 between the terminals 230, 232, and the analog-to-digital converter 660 generates an output voltage value based on the measured output voltage.

The ADC differential channel 667 has input pins P13, P14 which are electrically coupled to the positive terminal 240 and the negative terminal 242, respectively, of the third battery cell 204 to measure an output voltage of the third battery cell 204 between the terminals 240, 242, and the analog-to-digital converter 660 generates an output voltage value based on the measured output voltage.

The ADC differential channel 668 has input pins P15, P16 which are electrically coupled to the positive battery module terminal 206 and a negative battery module terminal 208 to measure a battery module output voltage of the battery module 42, and the analog-to-digital converter 660 generates a battery module output voltage value based on the measured battery module output voltage.

The ADC differential channel 669 has input pins P17, P18 which are electrically coupled to the positive terminal 320 and the negative terminal 322, respectively, of the first battery cell 300 to measure an output voltage of the first battery cell 300 between the terminals 320, 322, and the analog-to-digital converter 660 generates an output voltage value based on the measured output voltage.

The ADC differential channel 670 has input pins P19, P20 which are electrically coupled to the positive terminal 330 and the negative terminal 332, respectively, of the second battery cell 302 to measure an output voltage of the second battery cell 302 between the terminals 330, 332, and the analog-to-digital converter 660 generates an output voltage value based on the measured output voltage.

The ADC differential channel 671 has input pins P21, P22 which are electrically coupled to the positive terminal 340 and the negative terminal 342, respectively, of the third battery cell 304 to measure an output voltage of the third battery cell 304 between the terminals 340, 342, and the analog-to-digital converter 660 generates an output voltage value based on the measured output voltage.

The ADC differential channel 672 has input pins P23, P24 which are electrically coupled to the positive battery module terminal 306 and a negative battery module terminal 308 to measure a battery module output voltage of the battery module 44, and the analog-to-digital converter 660 generates a battery module output voltage value based on the measured battery module output voltage.

The ADC differential channel 673 has input pins P25, P26 which are electrically coupled to the positive terminal 420 and the negative terminal 422, respectively, of the first battery cell 400 to measure an output voltage of the first battery cell 400 between the terminals 420, 422, and the analog-to-digital converter 660 generates an output voltage value based on the measured output voltage.

The ADC differential channel 674 has input pins P27, P28 which are electrically coupled to the positive terminal 430 and the negative terminal 432, respectively, of the second battery cell 402 to measure an output voltage of the second battery cell 402 between the terminals 430, 432, and the analog-to-digital converter 660 generates an output voltage value based on the measured output voltage.

The ADC differential channel 675 has input pins P29, P30 which are electrically coupled to the positive terminal 440 and the negative terminal 442, respectively, of the third battery cell 404 to measure an output voltage of the third battery cell 404 between the terminals 440, 442, and the analog-to-digital converter 660 generates an output voltage value based on the measured output voltage.

The ADC differential channel 676 has input pins P31, P32 which are electrically coupled to the positive battery module terminal 406 and a negative battery module terminal 408 to measure a battery module output voltage of the battery module 46, and the analog-to-digital converter 660 generates a battery module output voltage value based on the measured battery module output voltage.

The voltage comparator 700 is electrically coupled to the input pins P1, P2 of the ADC differential channel 661, and compares the output voltage (between input pins P1, P2) of the first battery cell 100 to a voltage comparator threshold voltage. If the output voltage of the first battery cell 100 is greater than the voltage comparator threshold voltage indicating a cell overvoltage condition, the voltage comparator 700 sets an associated comparator output bit to a binary "1" value (i.e., a fault value). Otherwise, the voltage comparator 700 sets the associated comparator output bit to a binary "0" value.

The voltage comparator 702 is electrically coupled to the input pins P3, P4 of the ADC differential channel 662, and compares the output voltage (between input pins P3, P4) of the second battery cell 102 to the voltage comparator threshold voltage. If the output voltage of the second battery cell 102 is greater than the voltage comparator threshold voltage indicating a cell overvoltage condition, the voltage comparator 702 sets an associated comparator output bit to a binary "1" value. Otherwise, the voltage comparator 702 sets the associated comparator output bit to a binary "0" value.

The voltage comparator 704 is electrically coupled to the input pins P5, P6 of the ADC differential channel 663, and compares the output voltage (between input pins P5, P6) of the third battery cell 104 to the voltage comparator threshold voltage. If the output voltage of the third battery cell 104 is greater than the voltage comparator threshold voltage indicating a cell overvoltage condition, the voltage comparator 704 sets an associated comparator output bit to a binary "1" value. Otherwise, the voltage comparator 704 sets the associated comparator output bit to a binary "0" value.

The voltage comparator 706 is electrically coupled to the input pins P9, P10 of the ADC differential channel 665, and compares the output voltage (between input pins P9, P10) of the first battery cell 200 to the voltage comparator threshold voltage. If the output voltage of the first battery cell 200 is greater than the voltage comparator threshold voltage indicating a cell overvoltage condition, the voltage comparator 706 sets an associated comparator output bit to a binary "1" value. Otherwise, the voltage comparator 706 sets the associated comparator output bit to a binary "0" value.

The voltage comparator 708 is electrically coupled to the input pins P11, P12 of the ADC differential channel 666, and compares the output voltage (between input pins P11, P12) of the second battery cell 202 to the voltage comparator threshold voltage. If the output voltage of the second battery cell 202 is greater than the voltage comparator threshold voltage indicating a cell overvoltage condition, the voltage comparator 708 sets an associated comparator output bit to a binary "1" value. Otherwise, the voltage comparator 708 sets the associated comparator output bit to a binary "0" value.

The voltage comparator 710 is electrically coupled to the input pins P13, P14 of the ADC differential channel 667, and compares the output voltage (between input pins P13, P14) of the third battery cell 204 to the voltage comparator threshold voltage. If the output voltage of the third battery cell 204 is greater than the voltage comparator threshold voltage indicating a cell overvoltage condition, the voltage comparator 710 sets an associated comparator output bit to a binary "1" value. Otherwise, the voltage comparator 710 sets the associated comparator output bit to a binary "0" value.

The voltage comparator 720 is electrically coupled to input pins P17, P18 of the ADC differential channel 669, and compares the output voltage (between input pins P17, P18) of the first battery cell 300 to a voltage comparator threshold voltage. If the output voltage of the first battery cell 300 is greater than the voltage comparator threshold voltage indicating a cell overvoltage condition, the voltage comparator 720 sets an associated comparator output bit to a binary "1" value (i.e., a fault value). Otherwise, the voltage comparator 720 sets the associated comparator output bit to a binary "0" value.

The voltage comparator 722 is electrically coupled to input pins P19, P20 of the ADC differential channel 670, and compares the output voltage (between input pins P19, P20) of the second battery cell 302 to the voltage comparator threshold voltage. If the output voltage of the second battery cell 302 is greater than the voltage comparator threshold voltage indicating a cell overvoltage condition, the voltage comparator 722 sets an associated comparator output bit to a binary "1" value. Otherwise, the voltage comparator 722 sets the associated comparator output bit to a binary "0" value.

The voltage comparator 724 is electrically coupled to input pins P21, P22 of the ADC differential channel 671, and compares the output voltage (between input pins P21, P22) of the third battery cell 304 to the voltage comparator threshold voltage. If the output voltage of the third battery cell 304 is greater than the voltage comparator threshold voltage indicating a cell overvoltage condition, the voltage comparator 724 sets an associated comparator output bit to a binary "1" value. Otherwise, the voltage comparator 724 sets the associated comparator output bit to a binary "0" value.

The voltage comparator 726 is electrically coupled to input pins P25, P26 of the ADC differential channel 673, and compares the output voltage (between input pins P25, P26) of the first battery cell 400 to the voltage comparator threshold voltage. If the output voltage of the first battery cell 400 is greater than the voltage comparator threshold voltage indicating a cell overvoltage condition, the voltage comparator 726 sets an associated comparator output bit to a binary "1" value. Otherwise, the voltage comparator 726 sets the associated comparator output bit to a binary "0" value.

The voltage comparator 728 is electrically coupled to input pins P27, P28 of the ADC differential channel 674, and compares the output voltage (between input pins P27, P28) of the second battery cell 402 to the voltage comparator threshold voltage. If the output voltage of the second battery cell 402 is greater than the voltage comparator threshold voltage indicating a cell overvoltage condition, the voltage comparator 728 sets an associated comparator output bit to a binary "1" value. Otherwise, the voltage comparator 728 sets the associated comparator output bit to a binary "0" value.

The voltage comparator 730 is electrically coupled to input pins P29, P30 of the ADC differential channel 675, and compares the output voltage (between input pins P29, P30) of the third battery cell 404 to the voltage comparator threshold voltage. If the output voltage of the third battery cell 404 is greater than the voltage comparator threshold voltage indicating a cell overvoltage condition, the voltage comparator 730 sets an associated comparator output bit to a binary "1" value. Otherwise, the voltage comparator 730 sets the associated comparator output bit to a binary "0" value.

The second microcontroller 602 operably communicates with the first microcontroller 600 utilizing a communication bus 604. Further, the second microcontroller 602 sets a fault line 606 from a first fault line voltage to a second fault line voltage if at least one of the first, second, and third output voltages of the first, second, and third battery cells 100, 102, 104, respectively, of the battery module 40 are greater than the voltage comparator threshold voltage, or at least one of the first, second, and third output voltages of the first, second, and third battery cells 200, 202, 204, respectively, of the battery module 42 are greater than the voltage comparator threshold voltage, or at least one of the first, second, and third output voltages of the first, second, and third battery cells 300, 302, 304, respectively, of the battery module 44 are greater than the voltage comparator threshold voltage, or at least one of the first, second, and third output voltages of the first, second, and third battery cells 400, 402, 404, respectively, of the battery module 46 are greater than the voltage comparator threshold voltage.

Referring to FIGS. 1 and 2, an exemplary table 780 stored in the memory device 632 in the first microcontroller 600 is illustrated. The table 780 has records 782, 784, 786, 788 therein. The table 780 includes battery cell analog overvoltage flag values which are associated with the first, second, and third battery cells 100, 102, 104, respectively, in the battery module 40. It is noted that each of the other battery modules would have a distinct table with other battery cell analog overvoltage flag values for battery cells in the other battery modules.

The record 782 is associated with the first, second, and third battery cells 100, 102, 104. The record 782 includes an initialization value which is a binary value "111" corresponding to the decimal value of "7." The first, second, and third battery cell analog overvoltage flags associated with the first, second, and third battery cells 100, 102, 104, respectively, are initially set equal to the initialization value "111"—which indicates that no overvoltage condition is initially detected in the first, second, and third battery cells 100, 102, 104.

The record 784 is associated with the first battery cell 100 in the battery module 40. The record 784 includes a first battery cell analog overvoltage flag value which is binary value "001" corresponding to the decimal value of "1." The first battery cell analog overvoltage flag associated with the first battery cell 100 is set equal to the first battery cell analog overvoltage flag value "001 if an overvoltage condition (corresponding to the first battery cell 100 having an output voltage value greater than a first threshold voltage value) is detected in the first battery cell 100.

The record 786 is associated with the second battery cell 102 in the battery module 40. The record 786 includes a second battery cell analog overvoltage flag value which is binary value "100" corresponding to the decimal value of "4." The second battery cell analog overvoltage flag associated with the second battery cell 102 is set equal to the second battery cell analog overvoltage flag value "100" if an overvoltage condition (corresponding to the second battery cell 102 having an output voltage value greater than a first threshold voltage value is detected in the second battery cell 102.

The record 788 is associated with the third battery cell 104 in the battery module 40. The record 788 includes a third battery cell analog overvoltage flag value which is binary value "010" corresponding to the decimal value of "2." The third battery cell analog overvoltage flag associated with the third battery cell 104 is set equal to the third battery cell analog overvoltage flag value "010" if an overvoltage condition (corresponding to the third battery cell 104 having an output voltage value greater than a first threshold voltage value) is detected in the third battery cell 104.

It is noted that in table 780, the initialization value and the first, second, third and fourth battery cell analog overvoltage flag values each have a Hamming distance of at least two from each other.

Referring to FIG. 3, an exemplary table 800 stored in the memory device 632 in the first microcontroller 600 is illustrated. The table 800 has records 802, 804, 806, 808 therein. The table 800 includes battery cell comparator overvoltage flag values which are associated with the first, second, and third battery cells 100, 102, 104, respectively, in the battery module 40 are illustrated. It is noted that each of the other modules would have a distinct table with other battery cell comparator overvoltage flag values for battery cells in the respective tables.

The record 802 is associated with the first, second, and third battery cells 100, 102, 104. The record 802 includes an initialization value which is a binary value "000" corresponding to the decimal value of "0." The first, second, and third battery cell comparator overvoltage flags associated with the first, second, and third battery cells 100, 102, 104, respectively, are initially set equal to the initialization value "000"—which indicates that no overvoltage condition is initially detected in the first, second, and third battery cells 100, 102, 104 by voltage comparators 700, 702, 704, respectively.

The record 804 is associated with the first battery cell 100 in the battery module 40. The record 804 includes a first battery cell comparator overvoltage flag value which is binary value "110" corresponding to the decimal value of "6." The first battery cell comparator overvoltage flag associated with the first battery cell 100 is set equal to the first battery cell comparator overvoltage flag value "110" if an overvoltage condition (corresponding to the first battery cell 100 having an output voltage level greater than the voltage comparator threshold voltage is detected in the first battery cell 100 by the voltage comparator 700.

The record 806 is associated with the second battery cell 102 in the battery module 40. The record 806 includes a second battery cell comparator overvoltage flag value which is binary value "011" corresponding to the decimal value of "3." The second battery cell comparator overvoltage flag associated with the second battery cell 102 is set equal to the second battery cell comparator overvoltage flag value "011" if an overvoltage condition (corresponding to the second battery cell 102 having an output voltage level greater than the voltage comparator threshold voltage is detected in the second battery cell 102 by the voltage comparator 702.

The record 808 is associated with the third battery cell 104 in the battery module 40. The record 808 includes a third battery cell comparator overvoltage flag value which is binary value "101" corresponding to the decimal value of "5." The third battery cell comparator overvoltage flag associated with the third battery cell 104 is set equal to the third battery cell comparator overvoltage flag value "101" if an overvoltage condition (corresponding to the third battery cell 104 having an output voltage level greater than the voltage comparator threshold voltage is detected in the third battery cell 104 by the voltage comparator 704.

It is noted that in table 800, the initialization value and the first, second, third and fourth battery cell comparator overvoltage flag values each have a Hamming distance of at least two from each other. Further, in table 800, the initialization value and the first, second, third and fourth battery cell comparator overvoltage flag values each have a Hamming distance of at least two from the initialization value and the first, second, third and fourth battery cell analog overvoltage flag values in the table 780.

Referring to FIGS. 1 and 4, an exemplary table 830 that is stored in the memory device 632 in the first microcontroller 600 is illustrated. The table 830 has records 831, 832, 833, 834 therein. The table 830 includes battery module numbers which are associated with the first, second, third, and fourth battery modules 40, 42, 44, 46, respectively.

The record 831 has a first battery module number associated with the battery module 40. In particular, the first battery module number is a binary value "110" corresponding to a decimal value "6."

The record 832 has a second battery module number associated with the battery module 42. In particular, the second battery module number is a binary value "001" corresponding to a decimal value "1."

The record 833 has a third battery module number associated with the battery module 44. In particular, the third battery module number is a binary value "100" corresponding to a decimal value "4."

The record 834 has a fourth battery module number associated with the battery module 46. In particular, the fourth battery module number is a binary value "111" corresponding to a decimal value "7."

Referring to FIGS. 1 and 5, an exemplary table 860 that is stored in the memory device 632 in the first microcontroller 600 is illustrated. The table 860 has records 861, 862, 863, 864, 865, 866, 867, 868, 869, 870, 871, 872 associated with battery cells 100, 102, 104, 200, 202, 204, 300, 302, 304, 400, 402, 404, respectively, therein. The table 860 is used to stored exemplary battery cell analog overvoltage flags therein.

The record 861 is associated with the first battery cell 100 in the battery module 40. The record 861 includes a first battery cell analog overvoltage flag which is binary value "001" (defined in table 780) indicating an overvoltage condition in the first battery cell 100, and a battery module number "110" (defined in table 830) associated with the battery module 40.

The record 862 is associated with the second battery cell 102 in the battery module 40. The record 862 includes a second battery cell analog overvoltage flag which is binary value "100" indicating an overvoltage condition in the second battery cell 102, and a battery module number "110" associated with the battery module 40.

The record 863 is associated with the third battery cell 104 in the battery module 40. The record 863 includes a third battery cell analog overvoltage flag which is binary value "010" indicating an overvoltage condition in the third battery cell 104, and a battery module number "110" associated with the battery module 40.

The record 864 is associated with the first battery cell 200 in the battery module 42. The record 864 includes a first battery cell analog overvoltage flag which is binary value "111" indicating a non-overvoltage condition in the first battery cell 200, and a battery module number "001" associated with the battery module 42.

The record 865 is associated with the second battery cell 202 in the battery module 42. The record 865 includes a second battery cell analog overvoltage flag which is binary value "111" indicating a non-overvoltage condition in the second battery cell 202, and a battery module number "001" associated with the battery module 42.

The record 866 is associated with the third battery cell 204 in the battery module 42. The record 866 includes a third battery cell analog overvoltage flag which is binary value "111" indicating a non-overvoltage condition in the third battery cell 204, and a battery module number "001" associated with the battery module 42.

The record 867 is associated with the first battery cell 300 in the battery module 44. The record 867 includes a first battery cell analog overvoltage flag which is binary value "111" indicating a non-overvoltage condition in the first battery cell 300, and a battery module number "100" associated with the battery module 44.

The record 868 is associated with the second battery cell 302 in the battery module 44. The record 868 includes a second battery cell analog overvoltage flag which is binary value "111" indicating a non-overvoltage condition in the second battery cell 302, and a battery module number "100" associated with the battery module 44.

The record 869 is associated with the third battery cell 304 in the battery module 44. The record 869 includes a third battery cell analog overvoltage flag which is binary value "111" indicating a non-overvoltage condition in the third battery cell 304, and a battery module number "100" associated with the battery module 44.

The record 870 is associated with the first battery cell 400 in the battery module 46. The record 870 includes a first battery cell analog overvoltage flag which is binary value "111" indicating a non-overvoltage condition in the first battery cell 400, and a battery module number "111" associated with the battery module 46.

The record 871 is associated with the second battery cell 402 in the battery module 46. The record 871 includes a second battery cell analog overvoltage flag which is binary value "111" indicating a non-overvoltage condition in the second battery cell 402, and a battery module number "111" associated with the battery module 46.

The record 872 is associated with the third battery cell 404 in the battery module 46. The record 872 includes a third battery cell analog overvoltage flag which is binary value "111" indicating a non-overvoltage condition in the third battery cell 404, and a battery module number "111" associated with the battery module 46.

Figure 6:
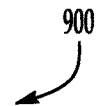
FIG. 6 is a second table of exemplary stored diagnostic information generated by the diagnostic system of FIG. 1.
Figure 7:
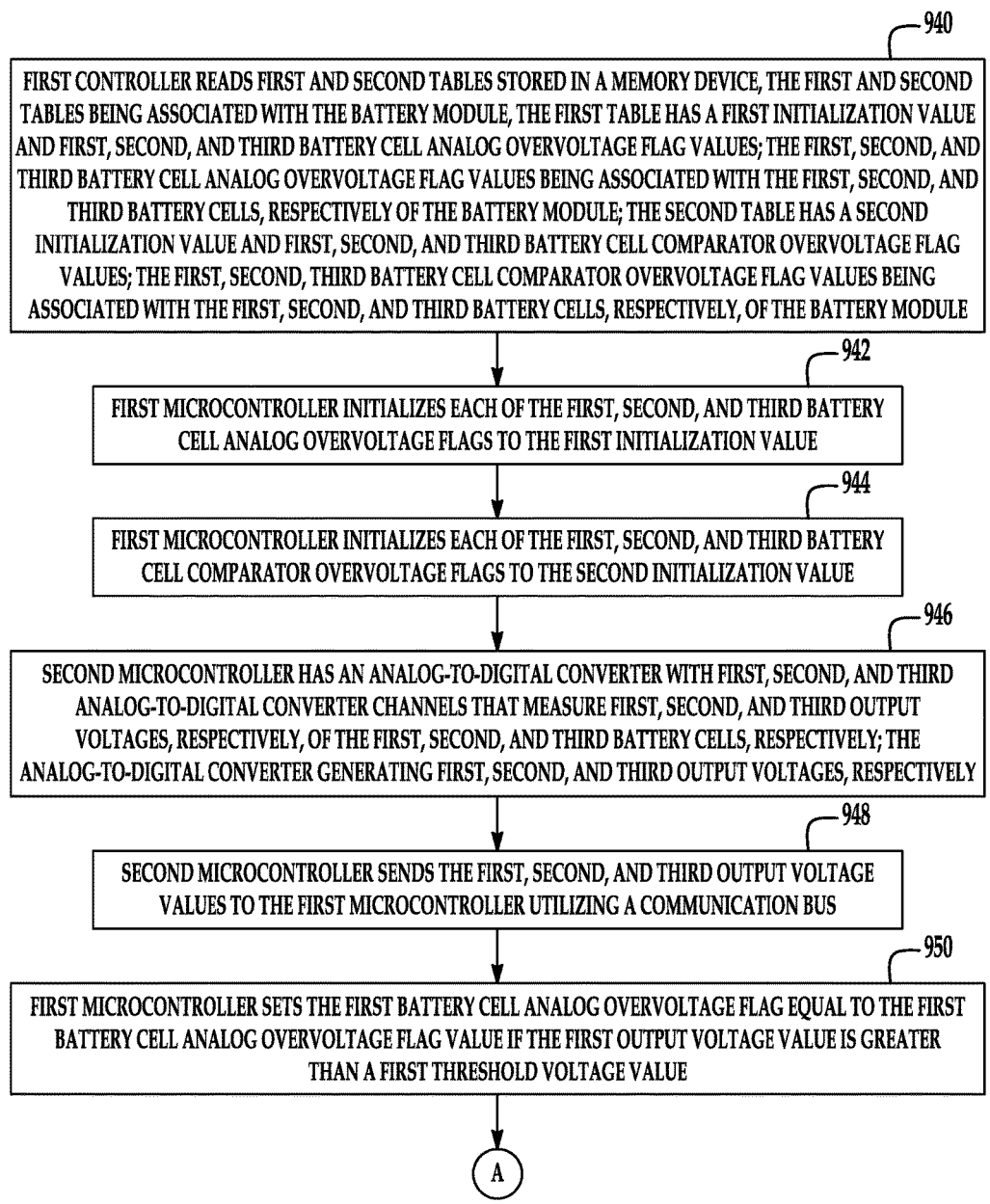
FIGS. 7-9 are flowcharts of a first diagnostic method utilized by the diagnostic system of FIG. 1.
Figure 8:
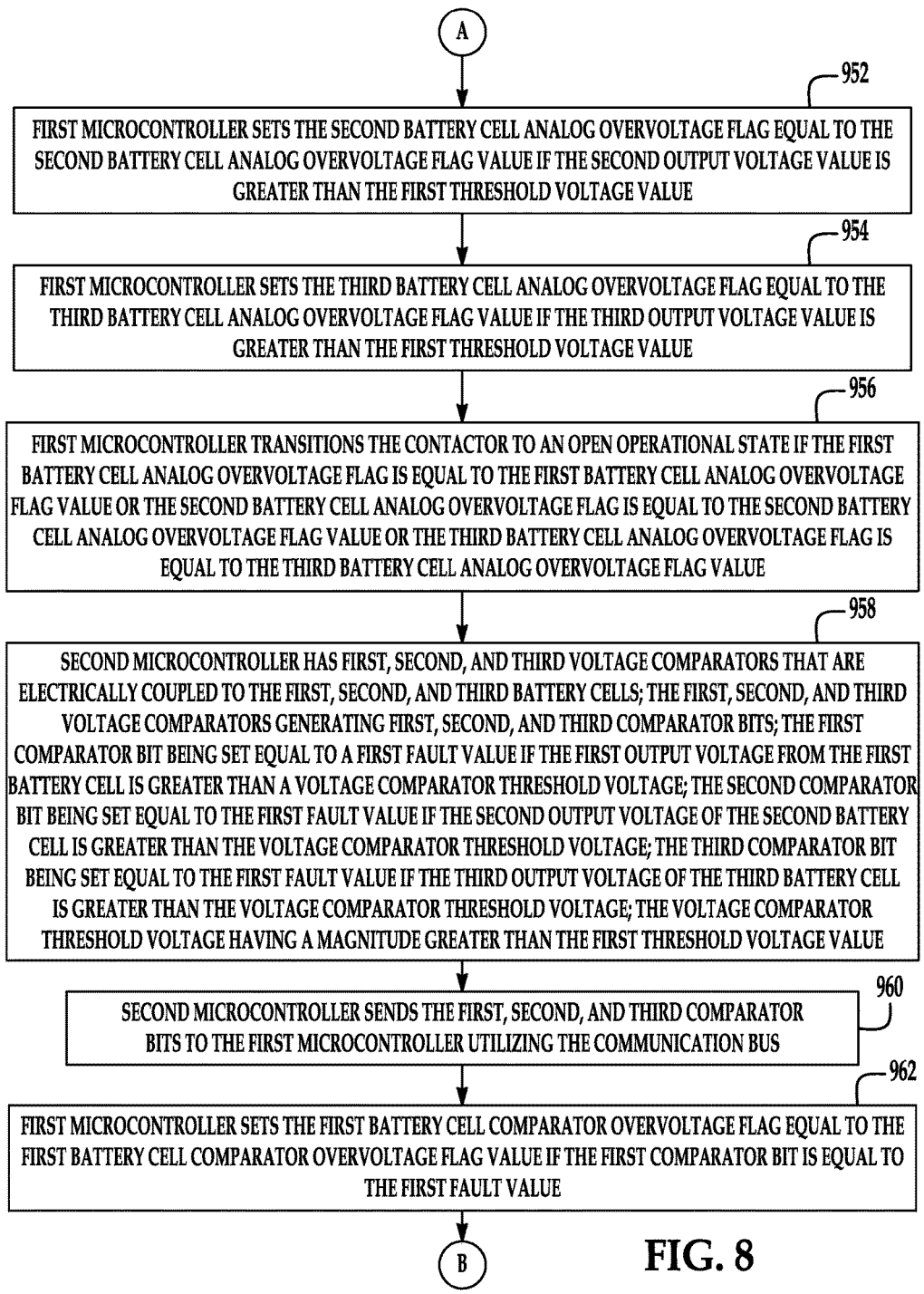
Figure 9:
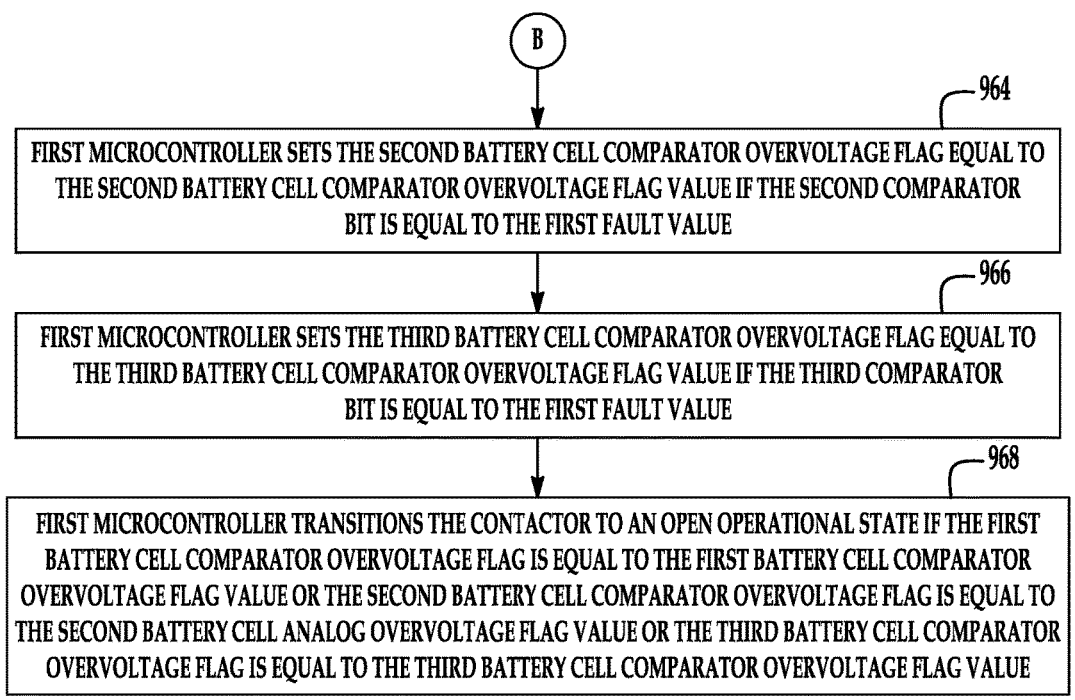
Figure 10:
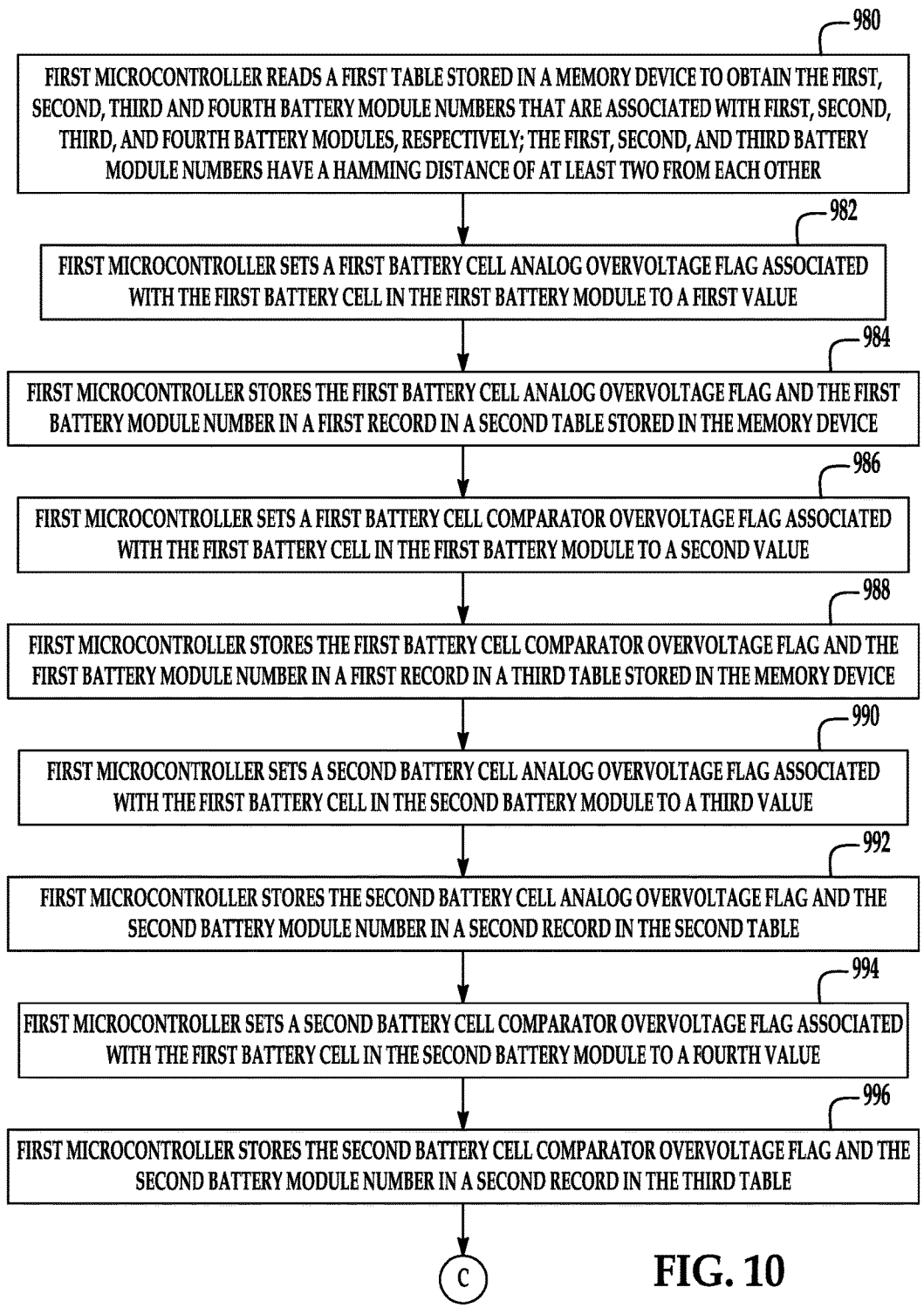
FIGS. 10-11 are flowcharts of a second diagnostic method utilized by the diagnostic system of FIG. 1.
Figure 11:
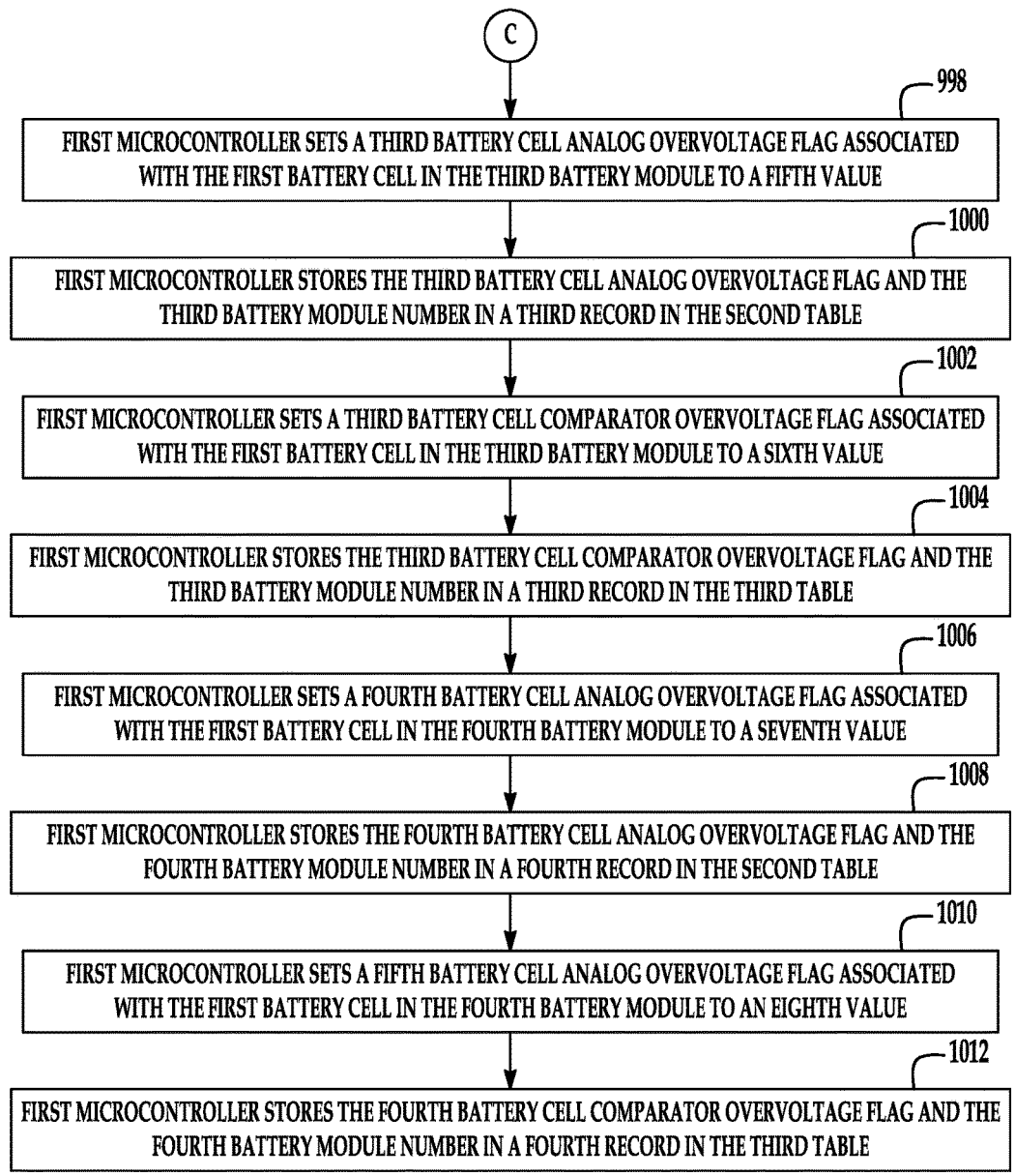

Referring to FIGS. 1 and 6, an exemplary table 900 that is stored in the memory device 632 in the first microcontroller 600 is illustrated. The table 900 has records 901, 902, 903, 904, 905, 906, 907, 908, 909, 910, 911, 912 associated with battery cells 100, 102, 104, 200, 202, 204, 300, 302, 304, 400, 402, 404, respectively, therein. The table 900 is used to stored exemplary battery cell comparator overvoltage flags therein.

The record 901 is associated with the first battery cell 100 in the battery module 40. The record 901 includes a battery module number "110" (defined in table 830) associated with the battery module 40, and a first battery cell comparator overvoltage flag which is binary value "011" (defined in table 800) indicating an overvoltage condition in the first battery cell 100.

The record 902 is associated with the second battery cell 102 in the battery module 40. The record 902 includes a battery module number "110" associated with the battery module 40, and a second battery cell comparator overvoltage flag which is binary value "101" indicating an overvoltage condition in the second battery cell 102.

The record 903 is associated with the third battery cell 104 in the battery module 40. The record 903 includes a battery module number "110" associated with the battery module 40, and a third battery cell comparator overvoltage flag which is binary value "110" indicating an overvoltage condition in the third battery cell 104.

The record 904 is associated with the first battery cell 200 in the battery module 42. The record 904 includes a battery module number "001" associated with the battery module 42, and a first battery cell comparator overvoltage flag which is binary value "000" indicating a non-overvoltage condition in the first battery cell 200.

The record 905 is associated with the second battery cell 202 in the battery module 42. The record 905 includes a battery module number "001" associated with the battery module 42, and a second battery cell comparator overvoltage flag which is binary value "000" indicating a non-overvoltage condition in the second battery cell 202.

The record 906 is associated with the third battery cell 204 in the battery module 42. The record 906 includes a battery module number "001" associated with the battery module 42, and a third battery cell comparator overvoltage flag which is binary value "000" indicating a non-overvoltage condition in the third battery cell 204.

The record 907 is associated with the first battery cell 300 in the battery module 44. The record 907 includes a battery module number "100" associated with the battery module 44, and a first battery cell comparator overvoltage flag which is binary value "000" indicating a non-overvoltage condition in the first battery cell 300.

The record 908 is associated with the second battery cell 302 in the battery module 44. The record 908 includes a battery module number "100" associated with the battery module 44, and a second battery cell comparator overvoltage flag which is binary value "000" indicating a non-overvoltage condition in the second battery cell 302.

The record 909 is associated with the third battery cell 304 in the battery module 44. The record 909 includes a battery module number "100" associated with the battery module 44, and a third battery cell comparator overvoltage flag which is binary value "000" indicating a non-overvoltage condition in the third battery cell 304.

The record 910 is associated with the first battery cell 400 in the battery module 46. The record 910 includes a battery module number "111" associated with the battery module 46, and a first battery cell comparator overvoltage flag which is binary value "000" indicating a non-overvoltage condition in the first battery cell 400.

The record 911 is associated with the second battery cell 402 in the battery module 46. The record 911 includes a battery module number "111" associated with the battery module 46, and a second battery cell comparator overvoltage flag which is binary value "000" indicating a non-overvoltage condition in the second battery cell 402.

The record 912 is associated with the third battery cell 404 in the battery module 46. The record 912 includes a battery module number "111" associated with the battery module 46, and a third battery cell comparator overvoltage flag which is binary value "000" indicating a non-overvoltage condition in the third battery cell 404.

Referring to FIGS. 1-3, and 7-9, the diagnostic system 26 implements a first diagnostic method for the battery module 40 in the battery system 20 which will be described in further detail below. In particular, the first diagnostic method is utilized to set first, second, and third battery cell analog overvoltage flag values associated with the first, second, and third battery cells 100, 102, 104, respectively, and to further set first, second, and third battery cell comparator overvoltage flag values associated with the first, second, and third battery cells 100, 102, 104, respectively, in order to determine whether at least one of the contactors 52, 54 should be transitioned from a closed operational state to an open operational state. For purposes of simplicity, the first diagnostic method will only be discussed with respect to the first, second, third battery cells 100, 102, 104 and battery module 40. However it should be understood that the first diagnostic method could further be implemented to encompass testing the battery cells in the other battery modules 42, 44, 46, in order to determine whether at least one of the contactors 52, 54 should be transitioned from a closed operational state to an open operational state. In an exemplary embodiment, the diagnostic system 26 transitions at least one of the contactors 52, 54 from a closed operational state to an open operational state if any of the battery cells 100, 102, 104 have an overvoltage condition. For example, when the first controller 600 transitions the contactor 52 from a closed operational state to an open operational state in the first diagnostic method, the first controller 600 could also simultaneously transition the contactor 54 from a closed operational state to an open operational state. However, for purposes of simplicity, the first diagnostic method will only be discussed with respect to the contactor 52. Further, it is assumed that prior to implementing the first diagnostic method that the first microcontroller 600 is generating control signals to induce the contactor 52 and the contactor 54 to each have closed operational states.

At step 940, the first microcontroller 600 reads tables 780, 800 (shown in FIGS. 2 and 3) stored in a memory device 630. The tables 780, 800 are associated with the battery module 40. The table 780 has a first initialization value and first, second, and third battery cell analog overvoltage flag values. The first, second, and third battery cell analog overvoltage flag values are associated with the first, second, and third battery cells 100, 102, 104, respectively, of the battery module 40. The table 800 has a second initialization value and first, second, and third battery cell comparator overvoltage flag values. The first, second, and third battery cell comparator overvoltage flag values are associated with first, second, and third battery cells 100, 102, 104, respectively, of the battery module 40. After step 940, the method advances to step 942.

At step 942, the first microcontroller 600 initializes each of first, second, and third battery cell analog overvoltage flags to the first initialization value (e.g., 111 shown in record 782 in FIG. 2). After step 942, the method advances to step 944.

At step 944, the first microcontroller 600 initializes each of first, second, and third battery cell comparator overvoltage flags to the second initialization value (e.g., 000 shown in record 802 in FIG. 3). After step 944, the method advances to step 946.

At step 946, the second microcontroller 602 has an analog-to-digital converter 660 with first, second, and third analog-to-digital converter differential channels 661, 662, 663 measuring first, second, and third output voltages, respectively, of the first, second, and third battery cells 100, 102, 104, respectively. The analog-to-digital converter 660 generates first, second, and third output voltage values based on the first, second, and third output voltages, respectively. After step 946, the method advances to step 948.

At step 948, the second microcontroller 602 sends the first, second, and third output voltage values to the first microcontroller 600 utilizing the communication bus 604. After step 948, the method advances to step 950.

At step 950, the first microcontroller 600 sets the first battery cell analog overvoltage flag equal to the first battery cell analog overvoltage flag value if the first output voltage value is greater than a first threshold voltage value. After step 950, the method advances to step 952.

At step 952, the first microcontroller 600 sets the second battery cell analog overvoltage flag equal to the second battery cell analog overvoltage flag value if the second output voltage value is greater than the first threshold voltage value. After step 952, the method advances to step 954.

At step 954, the first microcontroller 600 sets the third battery cell analog overvoltage flag equal to the third battery cell analog overvoltage flag value if the third output voltage value is greater than the first threshold voltage value. After step 954, the method advances to step 956.

At step 956, the first microcontroller 600 transitions the contactor 52 to an open operational state if the first battery cell analog overvoltage flag is equal to the first battery cell analog overvoltage flag value or the second battery cell analog overvoltage flag equal to the second battery cell analog overvoltage flag value or the third battery cell analog overvoltage flag equal to the third battery cell analog overvoltage flag value. After step 956, the method advances to step 958.

At step 958, the second microcontroller 602 has first, second, and third voltage comparators 700, 702, 704 that are electrically coupled to the first, second, and third battery cells 100, 102, 104. The first, second, and third voltage comparators 700, 702, 704 generate first, second, and third comparator bits. The first comparator bit is set equal to a first fault value by the first voltage comparator 700 if the first output voltage from the first battery cell is greater than a voltage comparator threshold voltage. The second comparator bit is set equal to the first fault value by the second voltage comparator 702 if the second output voltage of the second battery cell is greater than the voltage comparator threshold voltage. The third comparator is set equal to the first fault value by the third voltage comparator 704 if the third output voltage of the third battery cell is greater than the voltage comparator threshold voltage. The voltage comparator threshold voltage has a magnitude that is greater than the first threshold voltage value. After step 958, the method advances to step 960.

At step 960, the second microcontroller 602 sends the first, second, and third comparator bits to the first microcontroller 600 utilizing the communication bus 604. After step 960, the method advances to step 962.

At step 962, the first microcontroller 600 sets the first battery cell comparator overvoltage flag equal to the first battery cell comparator overvoltage flag value if the first comparator bit is equal to the first fault value. After step 962, the method advances to step 964.

At step 964, the first microcontroller 600 sets the second battery cell comparator overvoltage flag equal to the second battery cell comparator overvoltage flag value if the second comparator bit is equal to the first fault value. After step 964, the method advances to step 966.

At step 966, the first microcontroller 600 sets the third battery cell comparator overvoltage flag equal to the third battery cell comparator overvoltage flag value if the third comparator bit is equal to the first fault value. After step 966, the method advances to step 968.

At step 968, the first microcontroller 600 transitions the contactor 52 to the open operational state if the first battery cell comparator overvoltage flag is equal to the first battery cell comparator overvoltage flag value or the second battery cell comparator overvoltage flag is equal to the second battery cell comparator overvoltage flag value or the third battery cell comparator overvoltage flag is equal to the third battery cell comparator overvoltage flag value. After step 968, the method is exited.

Referring to FIGS. 1, 5, 6 and 10-11, the diagnostic system 26 implements a second diagnostic method for the battery modules 40, 42, 44, 46 in the battery system 20 which will be described in further detail below. The second diagnostic method is directed to storing battery cell analog overvoltage flags and associated battery module numbers in a table 860 (shown in FIG. 5), and storing batteries cell comparator overvoltage flags and associated battery module numbers in the table 900 (shown in FIG. 6). For purposes of simplicity, the second diagnostic method will only be discussed with respect to the first battery cell in each of the battery modules 40, 42, 44, 46. However it should be understood that the second diagnostic method could further be implemented with respect to all of the battery cells in the battery modules 40, 42, 44, 46. Further it should be understood that the battery cell analog overvoltage flags will be stored in the table 860 after the battery cell analog overvoltage flags are set to specific values during diagnostic overvoltage tests (described in the first diagnostic method with respect to module 40) of the battery cells in the battery modules 40, 42, 44, 46. Similarly, the battery cell comparator overvoltage flags will be stored in the table 900 after the battery cell analog overvoltage flags are set to specific values during diagnostic overvoltage tests (described in the first diagnostic method with respect to module 40) of the battery cells in the battery modules 40, 42, 44, 46.

At step 980, the first microcontroller 600 reads the table 830 (shown in FIG. 4) stored in the memory device 632 to obtain the first, second, third and fourth battery module numbers that are associated with battery modules 40, 42, 44, 46, respectively. The first, second, and third battery module numbers have a Hamming distance of at least two from each other. After step 980, the method advances to step 982.

At step 982, the first microcontroller 600 sets a first battery cell analog overvoltage flag associated with the first battery cell 100 in the battery module 40 to a first value (e.g., 001). After step 982, the method advances to step 984.

At step 984, the first microcontroller 600 stores the first battery cell analog overvoltage flag and the first battery module number (e.g., 110) in the record 861 in the table 860 stored in the memory device 632. After step 984, the method advances to step 986.

At step 986, the first microcontroller 600 sets a first battery cell comparator overvoltage flag associated with the first battery cell 100 in the battery module 40 to a second value (e.g., 011). After step 986, the method advances to step 988.

At step 988, the first microcontroller 600 stores the first battery cell comparator overvoltage flag and the first battery module number in the record 901 in the table 900 stored in the memory device 632. After step 988, the method advances to step 990.

At step 990, the first microcontroller 600 sets a second battery cell analog overvoltage flag associated with the first battery cell 200 in the battery module 42 to a third value. After step 990, the method advances to step 992.

At step 992, the first microcontroller 600 stores the second battery cell analog overvoltage flag and the second battery module number in the record 864 in the table 860. After step 992, the method advances to step 994.

At step 994, the first microcontroller 600 sets a second battery cell comparator overvoltage flag associated with the first battery cell 200 in the battery module 42 to a fourth value. After step 994, the method advances to step 996.

At step 996, the first microcontroller 600 stores the second battery cell comparator overvoltage flag and the second battery module number in the record 904 in the table 900. After step 996, the method advances to step 998.

At step 998, the first microcontroller 600 sets a third battery cell analog overvoltage flag associated with the first battery cell 300 in the battery module 44 to a fifth value. After step 998, the method advances to step 1000.

At step 1000, the first microcontroller 600 stores the third battery cell analog overvoltage flag and the third battery module number in the record 867 in the table 860. After step 1000, the method advances to step 1002.

At step 1002, the first microcontroller 600 sets a third battery cell comparator overvoltage flag associated with the first battery cell 300 in the battery module 44 to a sixth value. After step 1002, the method advances to step 1004.

At step 1004, the first microcontroller 600 stores the third battery cell comparator overvoltage flag and the third battery module number in the record 907 in the table 900. After step 1004, the method advances to step 1006.

At step 1006, the first microcontroller 600 sets a fourth battery cell analog overvoltage flag associated with the first battery cell 400 in the battery module 46 to a seventh value. After step 1006, the method advances to step 1008.

At step 1008, the first microcontroller 600 stores the fourth battery cell analog overvoltage flag and the fourth battery module number in the record 870 in the table 860. After step 1008, the method advances to step 1010.

At step 1010, the first microcontroller 600 sets a fifth battery cell analog overvoltage flag associated with the first battery cell 400 in the battery module 46 to an eighth value. After step 1010, the method advances to step 1012.

At step 1012, the first microcontroller 600 stores the fourth battery cell comparator overvoltage flag and the fourth battery module number in the record 910 in the table 900. After step 1012, the method is exited.

The above-described methods can be at least partially embodied in the form of one or more memory devices having computer-executable instructions for practicing the methods. The memory devices can comprise one or more of the following: hard drives, RAM memory, flash memory, and other computer-readable media known to those skilled in the art; wherein, when the computer-executable instructions are loaded into and executed by one or more microcontrollers, the microcontrollers become an apparatus programmed to practice the associated steps of the method. Further, for purposes of understanding, when a voltage value corresponds to (or is based on) a voltage, the voltage value is proportional to or equal to a magnitude or a frequency of the voltage.

The diagnostic system described herein provides a substantial advantage over other systems. In particular, an advantage of the diagnostic system is that the system utilizes two independent types of flags (e.g., battery cell analog overvoltage flags and battery cell comparator overvoltage flags) that can be set to fault values, based on a first threshold voltage value and a magnitude of a voltage comparator threshold voltage, respectively, that are different from one another—to determine when a contactor is to be transitioned to an open operational state. As a result, the diagnostic system has diagnostic diversity and can command the contactor to open to remove electrical power from a load (e.g., a DC-AC inverter and an electric motor) when a battery cell analog overvoltage flag indicates an output voltage value of a battery cell in the battery module is greater than a first threshold voltage value, or when a battery cell comparator overvoltage flag indicates that an output voltage of a battery cell in the battery module is greater than a magnitude of a voltage comparator threshold voltage, wherein the voltage comparator threshold voltage has a magnitude that is greater than the first threshold voltage value.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A diagnostic system for a battery system having a battery module electrically coupled to a contactor, the battery module having a first battery cell, comprising:
   a first microcontroller initializing a first battery cell analog overvoltage flag associated with the first battery cell to a first initialization value;
   the first microcontroller receiving a first output voltage value from a second microcontroller that corresponds to a first output voltage from the first battery cell;
   the first microcontroller setting the first battery cell analog overvoltage flag equal to a first battery cell analog overvoltage flag value if the first output voltage value is greater than a first threshold voltage value;
   the first microcontroller transitioning the contactor to an open operational state if the first battery cell analog overvoltage flag is equal to the first battery cell analog overvoltage flag value;
   the first microcontroller initializing a battery cell comparator overvoltage flag to the second initialization value;
   the first microcontroller receiving a first comparator bit, from the second microcontroller; the first comparator bit having a first fault value if the first output voltage is greater than a voltage comparator threshold voltage;
   the first microcontroller setting the first battery cell comparator overvoltage flag equal to the first battery cell comparator overvoltage flag value if the first comparator bit is equal to the first fault value; and
   the first microcontroller transitioning the contactor to the open operational state if the first battery cell comparator overvoltage flag is equal to the first battery cell comparator overvoltage flag value.

2. The diagnostic system of claim 1, wherein the first microcontroller obtains the first initialization value and the first battery cell analog overvoltage flag value by reading a first table stored in the memory device, the first table being associated with the battery module; the first table having the first initialization value and the first battery cell analog overvoltage flag value therein.

3. The diagnostic system of claim 2, wherein the first microcontroller obtains the second initialization value and the first battery cell comparator overvoltage flag value by reading a second table stored in the memory device; the second table being associated with the battery module; the second table having the second initialization value and the first battery cell comparator overvoltage flag value therein.

4. The diagnostic system of claim 1, wherein the first initialization value and the first battery cell analog overvoltage flag value each have a Hamming distance of at least two from each other; and the second initialization value and the first battery cell comparator overvoltage flag value each have a Hamming distance of at least two from each other.

5. The diagnostic system of claim 4, wherein each of the first initialization value and the first battery cell analog overvoltage flag value have the Hamming distance of at least two from each of the second initialization value and the first battery cell comparator overvoltage flag value.

6. The diagnostic system of claim 1, wherein:
   the second microcontroller includes an analog-to-digital converter with a first analog-to-digital converter differential channel measuring the first output voltage of the first battery cell; the analog-to-digital converter generating the first output voltage value based on the first output voltage.

7. The diagnostic system of claim 6, wherein:
   the second microcontroller operably communicates with the first microcontroller utilizing a communication bus; and
   the second microcontroller sending the first output voltage value to the first microcontroller utilizing the communication bus.

8. The diagnostic system of claim 7, wherein the second microcontroller further includes a first voltage comparator therein which is electrically coupled to the first battery cell;
   the first voltage comparator setting the first comparator bit equal to the first fault value if the first output voltage of the first battery cell is greater than the voltage comparator threshold voltage; and
   the second microcontroller sending the first comparator bit to the first microcontroller utilizing the communication bus.

9. The diagnostic system of claim 1, wherein the battery module further includes second and third battery cells:
   the first microcontroller initializing each of second and third battery cell analog overvoltage flags associated with the second and third battery cells, respectively, to the first initialization value;
   the first microcontroller receiving second and third output voltage values from the second microcontroller, the second and third output voltage values corresponding to second and third output voltages, respectively, from the second and third battery cells, respectively;
   the first microcontroller setting the second battery cell analog overvoltage flag equal to a second battery cell analog overvoltage flag value if the second output voltage value is greater than the first threshold voltage value;
   the first microcontroller setting the third battery cell analog overvoltage flag equal to a third battery cell analog overvoltage flag value if the third output voltage value is greater than the first threshold voltage value; and
   the first microcontroller transitioning the contactor to the open operational state if the second battery cell analog overvoltage flag is equal to the second battery cell analog overvoltage flag value or the third battery cell analog overvoltage flag is equal to the third battery cell analog overvoltage flag value.

10. The diagnostic system of claim 9, wherein:
    the first microcontroller initializing each of second and third battery cell comparator overvoltage flags to the second initialization value;
    the first microcontroller receiving second and third comparator bits from the second microcontroller; the second comparator bit having the first fault value if the second output voltage is greater than the voltage comparator threshold voltage; the third comparator bit having the first fault value if the third output voltage is greater than voltage comparator threshold voltage; the voltage comparator threshold voltage having a magnitude that is greater than the first threshold voltage value;

the first microcontroller setting the second battery cell comparator overvoltage flag equal to a second battery cell comparator overvoltage flag value if the second comparator bit is equal to the first fault value;

the first microcontroller setting the third battery cell comparator overvoltage flag equal to a third battery cell comparator overvoltage flag value if the third comparator bit is equal to the first fault value; and the first microcontroller transitioning the contactor to the open operational state if the second battery cell comparator overvoltage flag is equal to the second battery cell comparator overvoltage flag value or the third battery cell comparator overvoltage flag is equal to the third battery cell comparator overvoltage flag value.

11. A diagnostic system for a battery system having first and second battery modules electrically coupled in series to a contactor, the first battery module having at least a first battery cell; the second battery module having at least a first battery cell, comprising:

a memory device having first, second, and third tables stored therein; the first table having first and second battery module numbers associated with the first and second battery modules, respectively; the first and second battery module numbers having a Hamming distance of at least two from each other;

a first microcontroller reading the first table stored in the memory device to obtain the first and second battery module numbers;

the first microcontroller setting a first battery cell analog overvoltage flag associated with the first battery cell in the first battery module to a first value;

the first microcontroller storing the first battery cell analog overvoltage flag and the first battery module number in a first record in the second table;

the first microcontroller setting a first battery cell comparator overvoltage flag associated with the first battery cell in the first battery module to a second value;

the first microcontroller storing the first battery cell comparator overvoltage flag and the first battery module number in a first record in the third table.

12. The diagnostic system of claim 11, wherein the first record in the second table has the first battery module number appended to an end of the first battery cell analog overvoltage flag.

13. The diagnostic system of claim 12, wherein the first record in the third table has the first battery cell comparator overvoltage flag appended to an end of the first battery module number.

14. The diagnostic system of claim 11, wherein:

the first microcontroller setting a second battery cell analog overvoltage flag associated with the first battery cell in the second battery module to a third value;

the first microcontroller storing the second battery cell analog overvoltage flag and the second battery module number in a second record in the second table;

the first microcontroller setting a second battery cell comparator overvoltage flag associated with the first battery cell in the second battery module to a fourth value; and the first microcontroller storing the second battery cell comparator overvoltage flag and the second battery module number in a second record in the third table.

15. The diagnostic system of claim 14, wherein the battery system includes third and fourth battery modules electrically coupled in series to the contactor, the third battery module having at least a first battery cell, the fourth battery module having at least a first battery cell, comprising:

the first table having third and fourth battery module numbers associated with the third and fourth battery modules, respectively;

the first microcontroller reading the first table stored in the memory device to obtain the third and fourth battery module numbers;

the first microcontroller setting a third battery cell analog overvoltage flag associated with the first battery cell in the third battery module to a fifth value;

the first microcontroller storing the third battery cell analog overvoltage flag and the third battery module number in a third record in the second table;

the first microcontroller setting a third battery cell comparator overvoltage flag associated with the first battery cell in the third battery module to a sixth value; and the first microcontroller storing the third battery cell comparator overvoltage flag and the third battery module number in a third record in the third table.

16. The diagnostic system of claim 15, wherein:

the first microcontroller setting a fourth battery cell analog overvoltage flag associated with the first battery cell in the fourth battery module to a seventh value;

the first microcontroller storing the fourth battery cell analog overvoltage flag and the fourth battery module number in a fourth record in the second table;

the first microcontroller setting a fourth battery cell comparator overvoltage flag associated with the first battery cell in the fourth battery module to an eighth value; and the first microcontroller storing the fourth battery cell comparator overvoltage flag and the fourth battery module number in a fourth record in the third table.

* * * * *